United States Patent [19]
Haraguchi

[11] Patent Number: 5,661,796
[45] Date of Patent: Aug. 26, 1997

[54] TELEPHONE SET

[75] Inventor: Shinya Haraguchi, Kanagawa, Japan

[73] Assignee: Sony Corporation, Tokyo, Japan

[21] Appl. No.: 529,509

[22] Filed: Sep. 18, 1995

[30] Foreign Application Priority Data

Sep. 29, 1994 [JP] Japan ................... 6-259389

[51] Int. Cl.$^6$ ............... H04M 1/64; H04M 11/00
[52] U.S. Cl. ............ 379/413; 379/70; 379/322; 455/462
[58] Field of Search .............. 379/413, 58, 59, 379/60, 61, 322, 387, 70, 167, 171

[56] References Cited

U.S. PATENT DOCUMENTS 5,073,928  12/1991  Shimanuki .................. 379/61
5,381,472   1/1995  Kobayashi et al. ........... 379/413

Primary Examiner—Krista M. Zele
Assistant Examiner—Jacques M. Saint-Surin
Attorney, Agent, or Firm—Jay H. Maioli

[57] ABSTRACT

A cordless telephone set including a master set and at least one personal set connected to a telephone line via the master set, in which the personal set has a detecting section for detecting whether the personal set is placed in a state wherein a battery within the personal set is charged by a charger, control keys including an outside line key, and a controller for connecting the personal set to the telephone line via the master set when it detects that the personal set is placed in the state not charged based on an output signal from the detecting section. The controller performs a process for connecting the personal set to the telephone line via the master set and a terminating process alternately based on an operation of the outside line key, and invalidating the operation of the outside line key for a predetermined period of time when the personal set is shifted from the state wherein the battery within the personal set is charged by the charger to the state not charged based on the output signal from the detecting section.

4 Claims, 2 Drawing Sheets

TELEPHONE SET

BACKGROUND OF THE INVENTION

1. Field of the Invention

The present invention generally relates to a telephone set and more particularly to a telephone set such as a cordless telephone set transmitting/receiving signals via a radio channel between a master set and a personal telephone set.

2. Description of the Related Art

A phone call from an outside line may be received by an ordinary telephone set or by a master set (connecting equipment) of a cordless telephone set by picking up a handset placed on a main body of the telephone set.

A phone call may be made through the outside line by inputting a destination phone number by dial keys of the handset or of the main body of the phone, following picking up the handset.

When the phone call is finished, an action of putting the handset back to the main body of the phone is taken.

When a phone call from the outside line is to be received by a personal set of the cordless phone, however, it is necessary to pick up the personal set and press an outside line key of the personal set. Then, the personal set and the master set are connected by radio as a radio channel and the master set is connected to the telephone line.

When a phone call is to be made from the personal set through the outside line, a destination phone number is inputted by dial keys of the personal set, following the actions of picking up the personal set and pressing the outside line key above.

When the phone call is finished, the outside line key of the personal set is pressed. Then, the master phone is released from the outside line and the radio is finished being transmitted/received between the master set and the personal set, entering a standby state. Then, a user puts the personal set on a desk or the like.

Thus, the above action peculiar to the personal set need to be taken when a phone call is received or is made through the outside line by the personal set of the cordless telephone set and it is inconvenient as compared to the case when a phone call is received/made through the outside line by the ordinary telephone set or the master set of the cordless telephone set.

Then, there has been provided a personal set equipped with a so-called function 'quick-talk' which allows the user to receive/make a phone call through the outside line just by taking the same action as in the ordinary telephone set or the master set of the cordless telephone set.

That is, when the personal set has the quick-talk function and when its user takes the action of picking up the personal set from its charger, the personal set is connected with the master set by radio automatically, even if the outside line key is not pressed, and the master set is connected to the telephone line. Accordingly, it becomes possible to talk over the phone thereafter when the action is taken to receive a phone call.

A phone call may be made by taking the action of inputting a destination phone number by dial keys of the personal set, following the action of picking up the personal set as described above.

It is convenient because those above-mentioned actions are the same as those taken when a phone call is received/made through the outside line by the ordinary telephone set or the master set of the cordless telephone set. That is, no special action needs to be taken for the personal set.

However, the personal set equipped with the above-mentioned quick-talk function may cause trouble. That is, some users put the personal set having the quick-talk function on a desk or the like without returning it back to the charger during standby (during when it is not used). Therefore, such user receives/starts to make a phone call by pressing the outside line key and finishes the phone call by pressing the outside line key.

When such user receives a phone call from the outside line when the personal set is put on the charger to charge the personal set, the user takes the actions of picking up the personal set from the charger and pressing the outside line key of the personal set picked up from the charger out of habit.

When such actions are taken, the personal set is put into a talk mode by the action picking up the personal set and the following action pressing the outside line key is taken during the talk mode as a result. Because a talk is terminated when the outside line key is pressed during the talk mode, the talk mode is terminated when the action of pressing the outside line key is taken.

That is, when such user who makes a telephone conversation by using the personal set and by operating the outside line key of the personal set having the quick-talk function habitually receives a phone call when he/she is charging the battery of the personal set and if the user presses the outside line key out of habit after picking up the personal set, the phone call is disconnected because the outside line key is pressed even though the personal set has been switched automatically to the talk mode.

A connection with the telephone line is also cut off by the same reason when the personal set is picked up from the charger and the outside line key is pressed to make a phone call.

SUMMARY OF THE INVENTION

It is therefore an object of the present invention to provide a cordless telephone set which resolves the above-mentioned problem.

It is another object of the present invention to provide a telephone set which resolves the above-mentioned problem.

In order to achieve the above-mentioned goal, according to the present invention, there is provided a cordless telephone set comprising a master set, at least one personal set and a charger for charging a battery of the personal set. The personal set is connected to a telephone line via the master set. The personal set comprises a detecting section for detecting whether the personal set is placed in a state wherein a battery within the personal set is being charged by the charger; a plurality of control keys including an outside line key; and a controller for connecting the personal set to the telephone line via the master set when it detects that the personal set is placed in a state wherein the battery is not charged based on an output signal from the detecting section, performing the process for connecting the personal set to the telephone line via the master set and a terminating process alternately based on an operation of the outside line key, and invalidating the operation of the outside line key for a predetermined period of time when the personal set is shifted from the state wherein the battery within the personal set is charged by the charger to the state of not being charged based on the output signal from the detecting section.

Further, according to the present invention, there is provided a telephone set comprising a master set; and at least one personal set transmitting/receiving signals to/from the master set via a radio channel and connected to a telephone line via the master set. The personal set comprises a secondary battery used as a power source; a charger for charging the secondary battery; a detecting section for detecting whether the personal set is connected with the charger; an outside line key; a controller for connecting the personal set to the telephone line via the master set when it detects that the personal set is picked out of the charger based on an output signal from the detecting section, for performing a process for connecting the personal set to the telephone line via the master set and a terminating process alternately based on an operation of the outside line key, and for invalidating the operation of the outside line key for a predetermined period of time when it detects that the personal set is shifted from the state wherein the personal set is connected with the charger to the state wherein the personal set is picked out of the charger based on the output signal of the detecting section.

The specific nature of the invention, as well as other objects, uses and advantages thereof, will clearly appear from the description and from the accompanying drawings.

DETAILED DESCRIPTION OF PREFERRED EMBODIMENT

A telephone set according to a preferred embodiment of the present invention will be explained below in detail with reference to the drawings. The embodiment described below will be explained exemplifying a telephone set which transmits/receives signals between a master set and a personal set thereof, i.e. a cordless telephone set.

Figure 1:
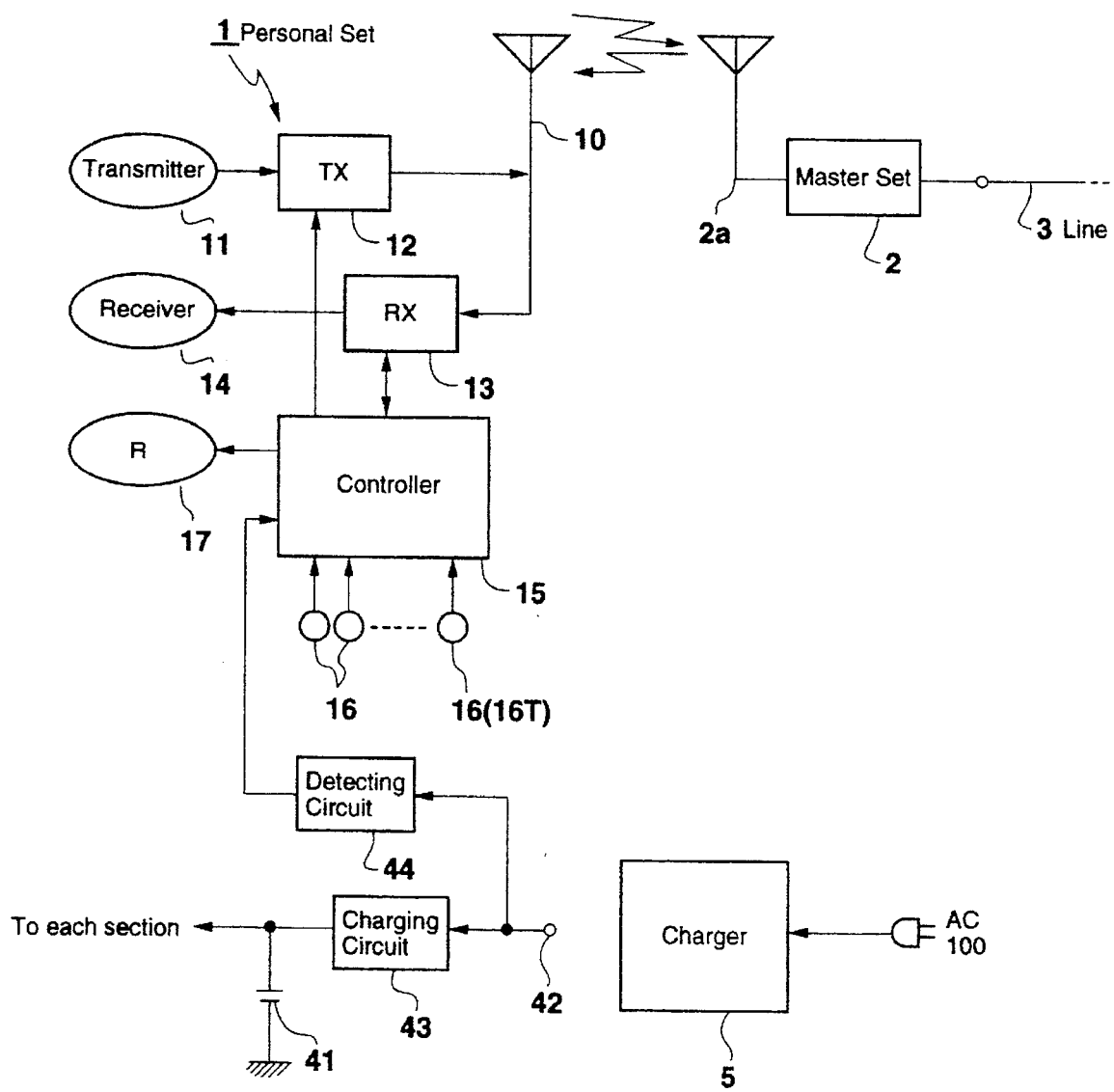
FIG. 1 is a block diagram illustrating a structure of a telephone set according to the present invention.

In FIG. 1, the cordless telephone set is equipped with the master set 2 and at least one personal set 1. The master set 2 is connected with a telephone line as an outside line. The master set 2 transmits signals from the telephone line 3 to the personal set 1 via an antenna 2a and receives signals transmitted from the personal set 1 by the antenna 2a to forward to the telephone line 3. The personal set 1 uses a secondary battery 41 as its power source as described later. The secondary battery 41 within the personal set 1 is charged when a terminal 42 provided in the personal set 1 is connected with a terminal of a charger 5 when the personal set 1 is placed on the charger 5. The charger 5 is connected with a domestic AC power source or a commercial AC power source.

The personal set 1 has a telephone transmitter 11 comprising a microphone, a transmitting circuit 12 for transmitting speech signals and command signals (data), a receiving circuit 13 for receiving speech signals and command signals and a telephone receiver 14 comprising a speaker unit.

The personal set 1 also has a controller 15 comprising a microcomputer, various control keys 16 and a ringer 17 for informing an incoming call or the like. Here, the controller 15 controls operation modes of the personal set 1 or the whole cordless telephone. That is, the controller 15 controls transmitting and receiving operations of the transmitting circuit 12 and the receiving circuit 13 and transmitting and receiving channels thereof and creates and decodes the command signals. A connecting routine 100 shown in FIG. 2 for example is stored in a ROM of the controller 15 as part of programs to be executed by a control section of the controller 15.

The personal set 1 has the secondary battery 41 for the power supply and a voltage output from the secondary battery 41 is supplied to each section of the personal set 1. When the personal set 1 is set on the charger 5, a charging voltage is supplied to the charging terminal 42 thereof as described before. The charging voltage at the charging terminal 42 is supplied to the secondary battery 41 via a charging circuit 43. Accordingly, the secondary battery 41 is charged while the personal set 1 is put on the charger 5.

At this time, a charge detecting circuit 44 detects whether the charging voltage exists or not at the charging terminal 42 and a result detected by the charge detecting circuit 44 is provided to the controller 15. Accordingly, the controller 15 can judge whether the personal set 1 is being placed on the charger 5, is being picked up from the charger 5 or has been returned to the charger 5 by monitoring the result detected by the detecting circuit 44.

Although not shown in the figure, the controller 15 also has a counter circuit for timing an elapsed time since when the personal set 1 has entered the talk mode as described later. When the control section of the controller 15 recognizes that the personal set 1 has been picked up from the charger 5 based on the detection output of the detecting circuit 44, the counter circuit starts to count reference clocks from a reference clock generating circuit within the controller 15 or that of outside based on a control signal from the control section. The counter circuit supplies an output signal to the control section when it counts the reference clocks equivalent to three seconds, for example, as described later or supplies a value counted by it to the control section as necessary. Based on the output signal from the counter circuit, the control section recognizes that a predetermined time has passed since the personal set 1 was picked up from the charger 5. The counter circuit may be reset by a control signal from the control section after it finishes counting the predetermined time or at the moment when the personal set 1 is returned to the charger 5. Note that it is also possible to time the time elapsed since the personal set 1 was shifted to the talk mode by providing a timer circuit, instead of the counter circuit, within the controller 15, though it may be a matter of choice.

Meanwhile, although not shown, the master set 2 is constructed almost in the same manner with the personal set 1 except for its power circuit system and that is connected to the line 3 as described before. The charger 5 includes a circuit for rectifying commercial AC voltage to create the charging voltage for the battery 41.

During a telephone conversation, speech signals from the transmitter 11 are supplied to the transmitting circuit 12 and are converted into up-channel FM signals. The FM signals output from the transmitting circuit 12 are then transmitted from an antenna 10 to the master set 2. The master set 2 receives the FM signals transmitted from the personal set 1 by the antenna 2a and demodulates them to reproduce the original speech signals. The reproduced speech signals are sent out to the line 3 by a transmitting circuit of the master that is not shown.

Speech signals from a person on the other end of the line are provided from the line 3 to the master set 2. The speech signals supplied to the master set 2 are converted into down-channel FM signals by the transmitting circuit of the master set 2. The signals are transmitted to the personal set 1 via the antenna 2a. In the personal set 1, the FM signals transmitted from the master set 2 are received by the antenna 10. The signals received by the antenna 10 are supplied to the receiving circuit 13 to implement signal processing such as demodulation to reproduce the original speech signals. The speech signals of the person on the other end of the line are then supplied to the receiver 14. Accordingly, it becomes possible to talk with the person on the other side of the line by using the personal set 1.

Figure 2:
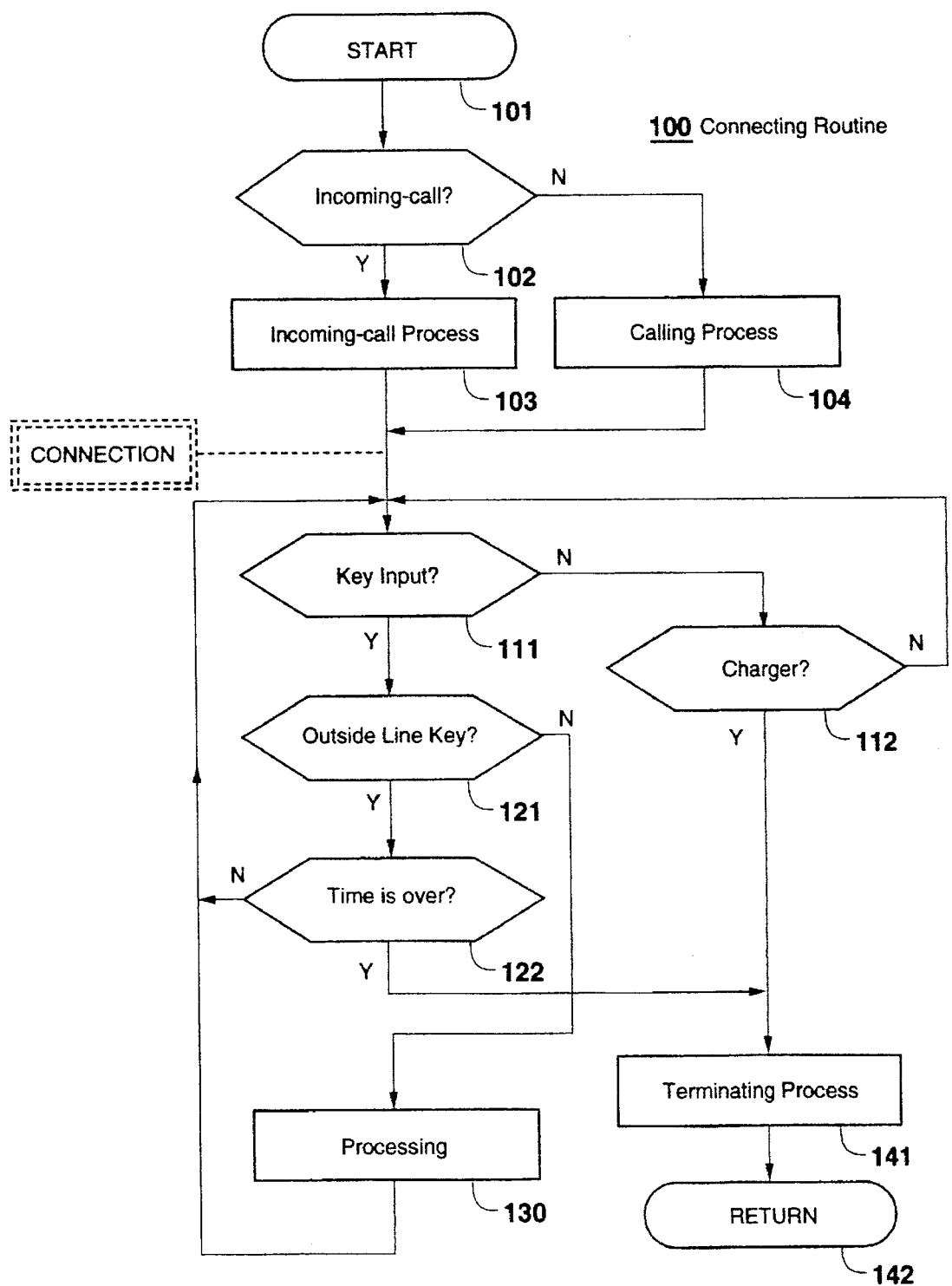
FIG. 2 is a flowchart illustrating control operations of a controller of the telephone set.

When a user picks up the personal set 1 from the charger 5 to receive/make a phone call, the detecting circuit 44 detects that the personal set 1 has been picked up and the control section of the controller 15 executes the connecting routine 100 shown in FIG. 2.

That is, when the personal set 1 is picked up from the charger 5, the charging voltage supplied to the charging terminal 42 is cut off. Because no charging voltage is supplied to the charging terminal 42, the detecting circuit 44 detects that no charging voltage exists at the terminal 42. This detection output of the detecting circuit 44 is supplied to the controller 15 and the controller 15 judges that the personal set 1 has been picked up from the charger 5. Then, the process of the control section of the controller 15 starts from Step 101 of the routine 100 and it is checked in Step 102 whether the personal set 1 is rung due to an incoming call or not. That is, it is discriminated whether the personal set 1 has been picked up from the charger 5 to receive the incoming call or to make a phone call.

When it is determined that the personal set 1 has been picked up from the charger 5 to receive an incoming phone call, the processing advances from Step 102 to Step 103, wherein the ringer 17 which is being rung due to the incoming call is turned off and a command signal specifying or enabling an off-hook process (to capture the line 3) is transmitted from the personal set 1 to the master set 2. As a result, the personal set 1 is connected with the line 3 via the master set 2.

Accordingly, the personal set 1 is put into the talk mode from this moment and it becomes possible to talk with a person on the other end of the line who has made the phone call.

The process of the controller 15 advances to Step 111 in this talk mode. In Step 111, it is checked whether any one of the control keys 16 has been operated or not. When no key of the control keys 16 has been operated, the process advances from Step 111 to Step 112 to check whether the personal set 1 is placed on the charger 5 or not. When it is not being placed thereon, the process returns from Step 112 to Step 111.

Accordingly, when the personal set 1 is picked up from the charger 5 to receive the incoming call, the personal set 1 is put into the talk mode wherein Steps 111 and 112 are repeated until when a key input is made or the personal set 1 is returned to the charger 5.

When any one of the keys 16 is pressed during when Steps 111 and 112 are repeated in the talk mode, it is discriminated that a key input has been made in Step 111 and the process advances from Step 111 to Step 121. In Step 121, it is discriminated whether the key input which has been discriminated in Step 111 is an outside line key 16T or not.

When it is determined that the key operated is not the outside line key 16T, the process advances from Step 121 to Step 130, wherein a process which corresponds to the pressed key such as a hold process is executed. After finishing such process by operating the same key again or by taking a releasing action, the process of the control section of the controller 15 is returned to Step 111.

If the key discriminated in Step 111 is determined to be the outside line key 16T in Step 121, the process advances from Step 121 to Step 122, wherein it is determined based on the count value from the counter circuit of the controller 15 described above whether a predetermined time, e.g. three seconds, has passed since when the process in Step 103 or Step 104 described later was executed, entering the talk mode. When the predetermined time has not passed yet after entering the talk mode, the process returns from Step 122 to Step 111.

Accordingly, even if the outside line key 16T is operated when the predetermined time, i.e. three seconds in this case, has not passed yet since when the personal set 1 was picked up from the charger 5, such operation is ignored. That is, the controller 15 invalidates the input of the outside line key 16T by rejecting it.

However, when it is determined in Step 122 that the outside line key 16T has been operated after three seconds has passed since Step 103 was executed and the personal set 1 was put into the talk mode, the process advances from Step 122 to Step 141, wherein a terminating process is executed. After that, the routine 100 is finished in Step 142.

Accordingly, while the personal set 1 is connected to the line 3 via the master set 2 and enters the talk mode when the personal set 1 is picked up from the charger 5 to receive a phone call, the outside line key 16T is invalidated for the first three seconds during the talk mode. It becomes valid when three seconds has passed.

The processes in Steps 111 and 112 are executed repeatedly during the talk mode. When the personal set 1 is placed on the charger 5 after finishing the talk, the controller 15 judges that in Step 112 based on the detection output of the detecting circuit 44 because a charging voltage is supplied again to the charging terminal 42. Then, the process advances from Step 112 to Step 141 and the routine 100 is finished after implementing the terminating process.

When the personal set 1 is picked up from the charger 5 during when it is not rung due to an incoming call in Step 102, i.e. when the personal set 1 is picked up to make a phone call, the process advances from Step 102 to Step 104, wherein a command signal specifying or enabling the off-hook process is transmitted to the master set 2. As a result, the personal set 1 is connected to the line 3 via the master set 2. Accordingly, the personal set 1 is allowed to input a destination telephone number from this moment.

The process of the controller 15, advances to Step 111, repeating Steps 111 and 112 thereafter. Accordingly, when a first digit of the destination telephone number is input through a dial key of the keys 16, the process advances from Step 111 to Step 130 via Step 121. A dialing signal of the first digit is sent out to the line 3 by Step 130 and the process returns to Step 111 thereafter. A second digit and thereafter of the destination telephone number are sent out in the same manner and when all the destination telephone number is sent out, a telephone conversation can be made when the person on the other side of the telephone answers the phone.

When the personal set 1 is returned to the charger 5 by finishing the conversation, the process advances to Step 141 via Step 112 to execute the terminating process as described above. Or, because three seconds normally passed since the execution of Step 104 in this case, the process advances from Step 111 to Step 141 via Steps 121 and 122 when the outside line key 16T is pressed and then the terminating process is executed.

As described above, according to the present invention, the operation of the outside line key 16T is invalidated during three seconds, for example, since the personal set 1 was picked up from the charger 5 to receive or to make a phone call, i.e. during such period when the outside line key 16T is pressed out of habit. Accordingly, the line 3 is not released even if the outside line key 16T is pressed out of habit when the personal set 1 is picked up from the charger 5.

Meanwhile, because three seconds has fully passed and the outside line key 16T is valid after a conversation, the conversation can be terminated by pressing the outside line key 16T. The present invention also prevents a call transfer from another telephone connected with the same line in parallel from being erroneously made.

The present invention also permits dealing with the erroneous operation of the outside line key 16T just by modifying the part of the processing routine 100 of the personal set 1 shown in FIG. 2.

While the present invention has been described in its preferred embodiment, it is to be understood that the invention is not limited thereto but may be otherwise variously embodied within the scope of the spirit of the present invention. For example, while it is detected whether the personal set 1 has been picked up from the charger 5 or not based on the presence of the charging voltage supplied to the charging terminal in the embodiment described above, it is also possible to provide, either at the personal set i or the charger 5, a detection switch which is operated when the personal set 1 is picked up from the charger 5 and which supplies an output signal for causing the controller 15 to recognize that the personal set 1 has been picked up from the charger 5.

What is claimed is:

1. A cordless telephone set, comprising:

a master set connected to a telephone line;

at least one personal set connected to the telephone line via said master set and including a plurality of control keys including an outside line key for operation by a user of the personal set;

charging means for charging a battery within said personal set;

detecting means for detecting whether said battery within said personal set is being charged by said charging means; and control means provided in said personal set for connecting said personal set to the telephone line via said master set when it detects that said battery of said personal set is not charged based on an output signal from said detecting means, performing the process of connecting said personal set to the telephone line via said master set and performing a terminating process alternately based on an operation of said outside line key, said control means invalidating the operation of said outside line key by the user for a predetermined time period when said personal set is shifted from a state wherein said battery within said personal set is charged by said charging means to a state wherein said battery within said personal set is not charged based on the output signal from said detecting means and wherein said control means includes timer means for starting a timing operation of said predetermined time period from a time when said personal set is shifted from the state wherein said battery within said personal set is charged to the state wherein said battery is not charged based on the output signal from said detecting means and said control means invalidates the operation of said outside line key when said outside line key is operated within said predetermined time period timed by said timer means.

2. The cordless telephone set according to claim 1, wherein said control means discriminates whether one of said plurality of control keys that is operated when said personal set is shifted from the state wherein said battery of said personal set is charged by said charging means to the state wherein it is not charged is said outside line key or not, invalidates the operation of said outside line key when it is determined that the operated key is said outside line key and validates the operation of the key when it is determined that any one of said plurality of control keys other than said outside line key has been operated.

3. A telephone set, comprising:

a master set connected to a telephone line; and at least one personal set transmitting/receiving signals to/from said master set via a radio channel and connected to the telephone line via said master set and including an outside line key operable by a user of the personal set;

said personal set comprising:

a secondary battery used as a power source therefor;

charging means for charging said secondary battery;

detecting means for detecting whether said personal set is connected with said charging means;

control means for connecting said personal set to the telephone line via said master set when said personal set is removed from said charging means based on an output signal from said detecting means, for performing a process of connecting said personal set to the telephone line via said master set and an alternate process of terminating a connection based on an operation of said outside line key, said control means invalidating the operation of said outside line key by the user for a predetermined time period when said personal set is shifted from a state wherein said personal set is connected with said charging means to a state wherein said personal set is removed from said charging means based on an output signal of said detecting means wherein said control means is equipped with timer means for starting a timing operation of the predetermined time period from a time when said personal set is shifted from the state wherein said personal set is connected with said charging means to the state wherein it is removed said charging means by the user based on the output signal from said detecting means and invalidates the operation of said outside line key when it is operated within the predetermined time period timed by said time means.

4. The telephone set according to claim 3, wherein said personal set further comprises a plurality of control keys and said control means discriminates whether a key operated when said personal set is shifted from the state wherein said personal set is connected with said charging means to the state wherein it is removed from said charging means is said outside line key or one of said plurality of control keys, invalidates the operation of said outside line key when the key operated is said outside line key and validates the operation of the key when it is determined that one of said plurality of control keys has been operated.

* * * * *